(12) United States Patent
Lo et al.

(10) Patent No.: US 12,487,121 B2
(45) Date of Patent: Dec. 2, 2025

(54) METHODS FOR CALIBRATING AN OPTICAL EMISSION SPECTROMETER

(71) Applicant: Applied Materials, Inc., Santa Clara, CA (US)

(72) Inventors: Kin Pong Lo, Fremont, CA (US); Lara Hawrylchak, Gilroy, CA (US); Malcolm J. Bevan, Santa Clara, CA (US); Theresa Kramer Guarini, San Jose, CA (US); Wei Liu, Beijing (CN); Bernard L. Hwang, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 114 days.

(21) Appl. No.: 18/581,626

(22) Filed: Feb. 20, 2024

(65) Prior Publication Data

US 2024/0192055 A1  Jun. 13, 2024

Related U.S. Application Data

(63) Continuation-in-part of application No. 17/604,814, filed as application No. PCT/US2020/025276 on Mar. 27, 2020, now Pat. No. 11,927,482.

(Continued)

(51) Int. Cl.
  *G01J 3/10* (2006.01)
  *G01J 3/02* (2006.01)
  (Continued)

(52) U.S. Cl.
  CPC .............. *G01J 3/28* (2013.01); *G01J 3/0218* (2013.01); *G01J 3/10* (2013.01); *G01J 3/443* (2013.01); *G01J 2003/2879* (2013.01)

(58) Field of Classification Search
  CPC .. G01J 3/10; G01J 3/0218; G01J 3/443; G01J 2003/2879; G01J 3/0205; G01J 3/28; G01J 3/36
  See application file for complete search history.

(56) References Cited

U.S. PATENT DOCUMENTS 5,450,205 A * 9/1995 Sawin ................ G01B 11/0675
                                            216/60
6,246,473 B1 * 6/2001 Smith, Jr. .............. G01J 3/443
                                            216/60

(Continued)

FOREIGN PATENT DOCUMENTS

JP    2003524753 A  *  8/2003  ............. G01J 3/443
KR   20100135764 A    12/2010
(Continued)

OTHER PUBLICATIONS

CN Office Action dtd Mar. 28, 2024 for Application No. 202080031181.8.

(Continued)

*Primary Examiner* — Abdullahi Nur
(74) *Attorney, Agent, or Firm* — Patterson + Sheridan, LLP

(57) ABSTRACT

One or more embodiments described herein generally relate to systems and methods for calibrating an optical emission spectrometer (OES) used for processing semiconductor substrates. In embodiments herein, a light fixture is mounted to a plate within a process chamber. A light source is positioned within the light fixture such that it provides an optical path that projects directly at a window through which the OES looks into the process chamber for its reading. When the light source is on, the OES measures the optical intensity of radiation from the light source. To calibrate the OES, the optical intensity of the light source is compared at two separate times when the light source is on. If the optical (Continued)

intensity of radiation at the first time is different than the optical intensity of radiation at the second time, the OES is modified.

20 Claims, 5 Drawing Sheets

Related U.S. Application Data

(60) Provisional application No. 62/839,416, filed on Apr. 26, 2019.

(51) Int. Cl.
  *G01J 3/28* (2006.01)
  *G01J 3/443* (2006.01)

(56) References Cited

U.S. PATENT DOCUMENTS

| | | | |
|---|---|---|---|
| 2004/0221957 A1* | 11/2004 | Ludviksson | H01J 37/32935 156/345.24 |
| 2018/0136118 A1 | 5/2018 | Kueny et al. | |

FOREIGN PATENT DOCUMENTS

| | | |
|---|---|---|
| TW | 201833532 A | 9/2018 |
| WO | 9954694 A1 | 10/1999 |
| WO | 2011154035 A1 | 12/2011 |

OTHER PUBLICATIONS

TW Search Report dated Apr. 12, 2024 for Taiwan Invention Patent Application No. 109113474.

\* cited by examiner

METHODS FOR CALIBRATING AN OPTICAL EMISSION SPECTROMETER

CROSS-REFERENCE TO RELATED APPLICATIONS

This application is a continuation-in-part of co-pending U.S. patent application Ser. No. 17/604,814, filed Mar. 27, 2020, which is a 371 of International patent application serial number PCT/US2020/025276, filed Mar. 27, 2020, which claims benefit of U.S. Provisional Patent Application 62/839,416, filed Apr. 26, 2019. Each of the aforementioned related patent applications is herein incorporated by reference.

BACKGROUND

Field

One or more embodiments described herein generally relate to methods and systems for processing semiconductor substrates, and more particularly, to methods and systems for calibrating an optical emission spectrometer used for processing semiconductor substrates.

Description of the Related Art

Within the semiconductor industry, an ever present need exists for improved process repeatability and control. As new generations of integrated circuits employ smaller feature sizes, greater demands are placed on the integrated circuit fabrication process. Deposition and etching of one or more layers on a semiconductor substrate in a plasma environment are two of the most common steps in integrated circuit manufacturing. Considering that many discrete plasma process chambers are employed to manufacture products intended to have the same properties, it is very important that a consistent result is produced from one chamber to another chamber. Therefore, to ensure that a consistent film is deposited or etched on the substrate, it is important to make sure that the various plasma process chambers are operated substantially in the same manner.

During a plasma process, certain plasma attributes, such as the plasma's electromagnetic emissions, the radio frequency (RF) power delivered to a substrate pedestal, substrate reflectance, process pressure, and process temperature, manifest low frequency fluctuations that contain significant information about the plasma process and plasma chamber. These attributes affect the resultant process, thereby giving different substrates different surface characteristics. The intensity of a plasma's optical emission spectra during plasma processing contains information related to the process state, process event, and process chamber. The optical emission spectra are affected to different degrees by varying chamber conditions and by process parameter changes.

Intensities of the optical emission spectra can be measured by an optical emission spectrometer (OES). Although the measurements of the OES are very effective, the processing cycles in the chamber can cause the OES to drift over time, affecting the quality of measurements. As such, the radiation intensity measured by the OES can become inaccurate over time, leading to inaccurate information related to the chamber parameter conditions. Therefore, the OES needs to be calibrated to correct the drifts that occur over time. However, conventional calibration methods are very time consuming and at times inaccurate.

Accordingly, there is a need for calibration methods of an OES that allow for a quicker and more accurate calibration.

SUMMARY

One or more embodiments described herein relate to methods for calibrating an optical emission spectrometer used for processing semiconductor substrates.

In one embodiment, a method for calibrating an optical emission spectrometer (OES) includes measuring an optical intensity of radiation from a light source mounted within a process chamber with an OES located outside the process chamber at a first time; measuring an optical intensity of radiation from the light source mounted within the process chamber with the OES located outside the process chamber at a second time; comparing the optical intensity of radiation at the first time with the optical intensity of radiation at the second time; and modifying the OES if the optical intensity of radiation at the first time is different than the optical intensity of radiation at the second time.

In another embodiment, a method for calibrating an optical emission spectrometer (OES) includes mounting a light fixture within a process chamber, wherein the light fixture includes a light source; measuring an optical intensity of radiation from the light source with an OES located outside the process chamber at a first time; removing the light fixture from the process chamber after measuring the optical intensity of radiation at the first time; performing a deposition of a semiconductor substrate after measuring the optical intensity of radiation at the first time; re-mounting the light fixture within the process chamber; measuring an optical intensity of radiation from the light source with the OES located outside the process chamber at a second time; comparing the optical intensity of radiation at the first time with the optical intensity of radiation at the second time; and modifying the OES when the optical intensity of radiation at the first time is different than the optical intensity of radiation at the second time.

One or more embodiments described herein also relate to systems for calibrating an optical emission spectrometer used for processing semiconductor substrates.

In one embodiment, a process system includes a process chamber; a plate mounted within the process chamber; an optical emission spectrometer (OES) located outside the process chamber; a light fixture mounted to the plate, wherein the light fixture includes a light source; wherein: an optical path is provided between the light source and the OES, and wherein the OES measures an optical intensity of radiation from the light source; and a computer-readable storage medium configured to receive information from the OES, and when executed by a processor performs an operation, comprising: comparing the optical intensity of radiation at a first time with the optical intensity of radiation at a second time; and modifying the OES if the optical intensity of radiation at the first time is different than the optical intensity of radiation at the second time.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not

DETAILED DESCRIPTION

In the following description, numerous specific details are set forth to provide a more thorough understanding of the embodiments of the present disclosure. However, it will be apparent to one of skill in the art that one or more of the embodiments of the present disclosure may be practiced without one or more of these specific details. In other instances, well-known features have not been described in order to avoid obscuring one or more of the embodiments of the present disclosure.

One or more embodiments described herein generally relate methods and systems for calibrating an optical emission spectrometer (OES) used for processing semiconductor substrates. In embodiments described herein, a light fixture is mounted to a plate within a process chamber. A light source within the light fixture is positioned such that it provides an optical path that projects directly at a window through which the OES looks into the process chamber for its reading. When the light source is on, the OES measures the optical intensity of radiation from the light source.

To calibrate the OES, the optical intensity of the light source is compared at two separate times when the light source is on. If the optical intensity of radiation at the first time is different than the optical intensity of radiation at the second time, the OES is modified. Embodiments herein provide the advantages of allowing the OES to be calibrated while it remains attached to the outside of the process chamber, saving time and providing more convenience when compared to conventional OES calibration methods. Additionally, the OES calibration is more accurate because the OES and its related parts remain in place throughout the calibration.

Figure 1:
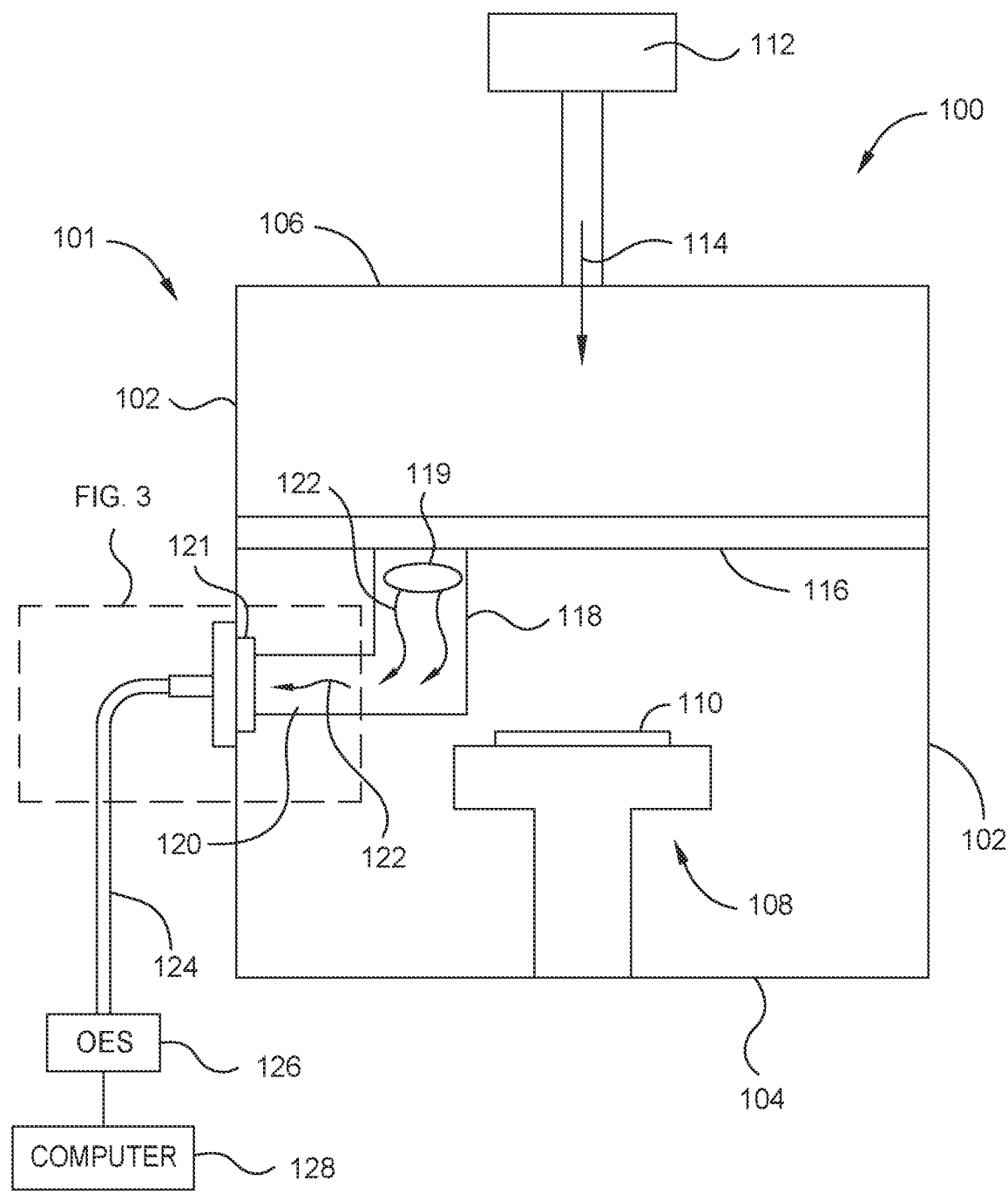
FIG. 1 is a schematic view of a semiconductor process system according to at least one embodiment described herein.

FIG. 1 is a schematic cross-sectional view of a semiconductor process system 100 according to at least one embodiment described herein. The process system 100 includes a process chamber 101. The process chamber 101 includes side walls 102, a bottom wall 104, and a top wall 106, forming a process volume. In these embodiments, a substrate support 108 supports a substrate 110 within the process chamber 101. The semiconductor process system 100 includes a plasma source 112 that introduces a plasma 114 into the process chamber 101.

The process chamber 101 also includes a plate 116. The plate 116 is mounted to one or more of the side walls 102 inside the process chamber 101. A light fixture 118 is mounted to the plate 116. The light source 119 is positioned within the light fixture 118 such that its optical path 122 projects directly at a window 121 through which an OES 126 looks into the process chamber 101 for its reading, which will be described in further detail below. Therefore, in some embodiments, the light fixture 118 can hang downwards from the plate 116 such that the light source 119 is in an ideal position for projecting the optical path 122 to the OES 126. The optical path 122 first travels from the light source 119 to a diffuser tube 120. From there, the optical path 122 exits the process chamber 101 through the window 121 and enters a fiber optic line 124 coupled to the OES 126. The optical intensity of radiation from the light source 119 is then measured in the OES 126. The measured optical intensity may be transferred to a computer 128 for analysis, manipulation, storage, and/or display, which is described further below.

Figure 2:
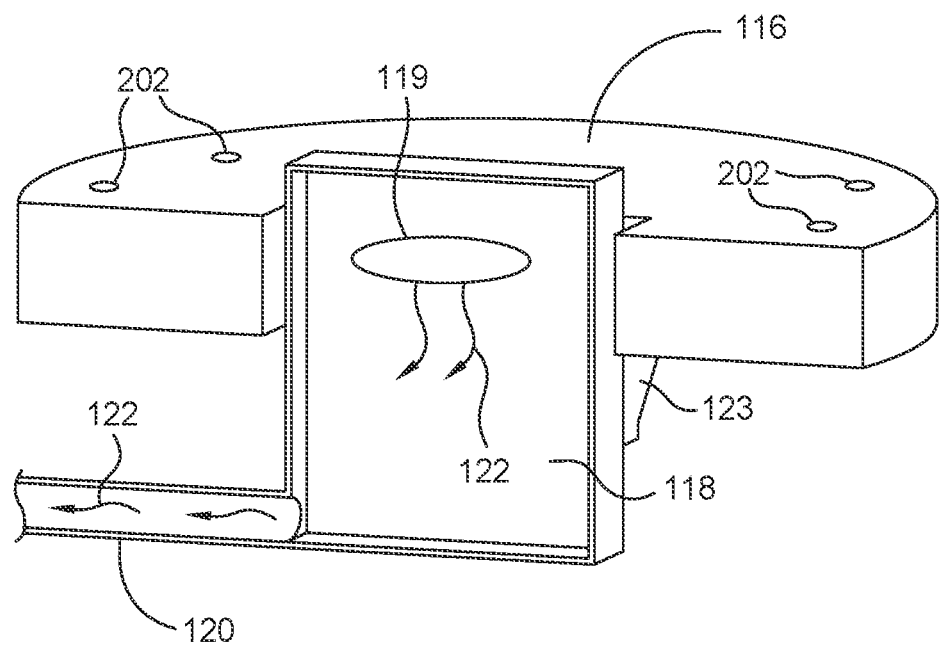
FIG. 2 is a schematic view of the light fixture mounted to the plate as described in FIG. 1.

FIG. 2 is a schematic view of the light fixture 118 mounted to the plate 116 as described in FIG. 1. In some embodiments, the plate 116 can be mounted to the process chamber 101 via a plurality of screws 202 (four shown in FIG. 2). The screws 202 can be spring-loaded captive screws with soft padded feet, advantageously protecting the process chamber 101 surfaces. The light fixture 118 is mounted to the plate 116 such that the optical path 122 of the light source 119 exits the process chamber 101 through the diffuser tube 120 as shown by the arrows in FIG. 2. The light fixture 118 is mounted to the plate 116 using a bracket 123 that is mounted to a bottom surface of the plate 116. The bracket 123 may be suitably loosened in order to move the light source 119 into the proper position described above. Although the bracket 123 is used to mount the light fixture 118 in some embodiments, the light fixture 118 can be mounted in other similar ways. The light source 119 is generally a source of light having a wavelength spectrum in the range from about 200 nm to about 800 nm. The light source 119 may include, for example, a mercury (Hg), xenon (Xe), or Hg—Xe lamp, a tungsten-halogen lamp, or the like. In some embodiments, the light source 119 is a xenon flash lamp. The position of the light source 119 within the light fixture 118 additionally advantageously avoids all process chamber 101 components. The plate 116 advantageously prevents the light fixture 118 and the light source 119 from falling into the bottom portion of the process chamber 101.

Figure 3:
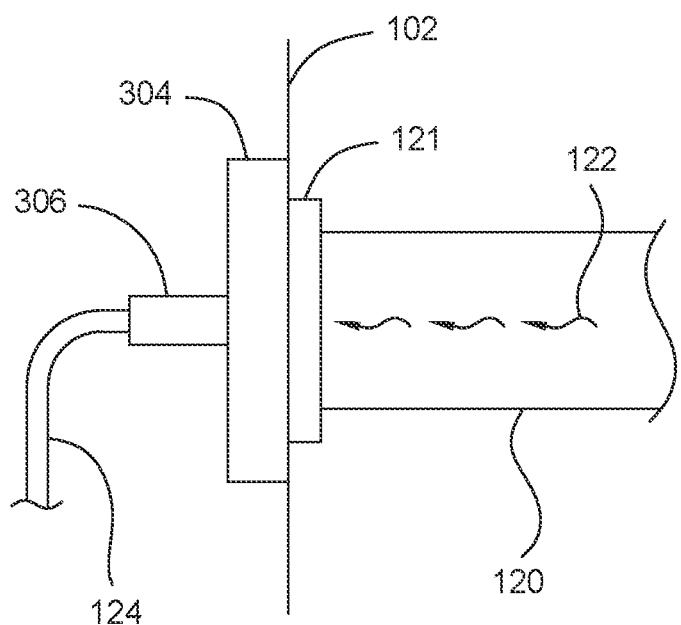
FIG. 3 is a close up schematic view of the optical path from the light source to the OES as described in FIG. 1.

FIG. 3 is a close up schematic view of the optical path 122 from the light source 119 to the OES 126 as described in FIG. 1. In these embodiments, the optical path 122 travels through the diffuser tube 120 and then enters an optical window 121. The optical window 121 is attached to the inside of the side wall 102 of the process chamber 101. The optical window 121 can be formed of sapphire, however other materials may be selected based on resistance to plasma source gases or transmissivity to optical emissions, as discussed below. The optical window 121 can be sealed via one or more o-rings (not shown) to facilitate sealing the optical window 121. In these embodiments, the diffuser 120 can be made of soft material near the optical window 121, advantageously protecting the side wall 102 of the process chamber 101 from scratching.

The fiber optic line 124 is positioned such that the optical path 122 travels through the diffuser 120 and the optical window 121 into the fiber optic line 124 to generate an optical signal therein. The fiber optic line 124 transmits the optical path 122 to the OES 126. In these embodiments, the fiber optic line 124 is a 400 μm core optical fiber, however other core sizes and various fiber materials may be selected for transmissivity of the optical path 122 and to manage signal strength within the fiber optic line 124. For example, plasmas that generate low level of optical signals may be monitored utilizing a relatively wide core (e.g., 400 μm) fiber optic line 124, while plasmas that generate higher levels of optical signals may be monitored utilizing relative narrower cores (e.g., 110 µm, 100 µm, 62.5 µm, 50 µm, 9 µm or other core sizes) in order to limit the optical path 122 reaching the OES 126. One or more filters may be utilized at the OES 126 to absorb stray light and/or emissions that are not within a spectral band of interest.

The OES 126 analyzes the signal of the optical path 122 from the fiber optic line 124 to identify emission peaks within the signal, including identifying specific emission peaks as corresponding to energy transmissions of specific elements. In some embodiments, spectra and/or information characterizing emission peaks therein may be viewed and/or manipulated in the OES 126. In these embodiments, the emission peak information may be transferred to the computer 128 for analysis, manipulation, storage, and/or display. The computer 128 may include a computer readable storage medium and processor, and the computer 128 may send and receive signals from other parts of the semiconductor process system 100.

In these embodiments, a fiber optic connector 306 terminates the fiber optic line 124, and a block 304 positions the fiber connector 306 with respect to the optical window 121, as shown in FIG. 3. The block 304 is advantageously fabricated of insulative materials such as plastic or ceramic to mitigate any possibility of electrical arcing. However, this embodiment is only one example, and other embodiments may provide a custom termination of the fiber optic line 124 that does not involve the fiber connector 306 and/or includes another connector with respect to the optical window 121 that may be implemented in place of the block 304.

Figure 4:
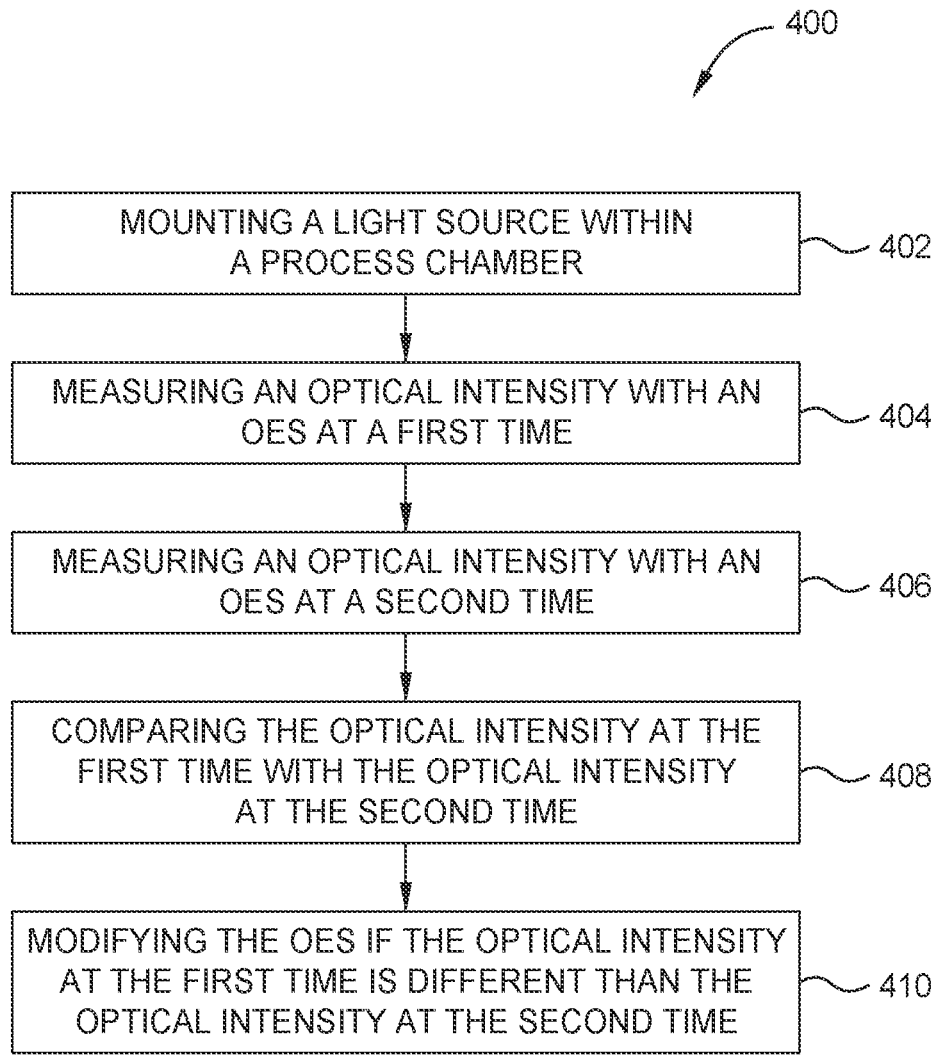
FIG. 4 is a method for calibrating the OES according to at least one embodiment described herein.

FIG. 4 is a method 400 for calibrating the OES 126 according to at least one embodiment described herein. In these embodiments, the method 400 is performed with the devices described in FIGS. 1-3, but is not limited to these devices and can be performed with other similar devices. In block 402, the light fixture 118 is mounted to the plate 116 within the process chamber 101. The light source 119 within the light fixture 118 provides the optical path 122 between the light source 119 and the OES 126 located outside the process chamber 101. As discussed above, the optical path 122 travels from the light source 119 into a diffuser tube 120 located inside the process chamber 101. The optical path 122 continues from the diffuser tube 120 through an optical window 121 attached to a side wall 102 of the process chamber 101, then from the optical window 121 into a fiber optic line 124. In block 404, the optical intensity of radiation from the light source 119 is measured with the OES 126 at a first time. The optical intensity of radiation from the light source 119 at the first time can show peaks of well-defined wavelengths for certain atoms, such as oxygen, for example. The measurements at the first time can occur before any processing has occurred and thus before any drifting of the OES 126 occurs. After measuring the optical intensity of radiation at the first time, the light fixture 118 can be removed from the process chamber 101 where a deposition process on the substrate 110 may then be performed any number of times. Thereafter, the light fixture 118 can be re-mounted to the plate 116 within the process chamber 101 in substantially the same position as in block 402.

In block 406, the optical intensity of radiation from the light source 119 is measured with an OES 126 at a second time. The second time can be any time after the first time, such as one month later, six months later, or one year later. As such, any number of substrates 110 may be processed between the first and second times, which can cause the OES 126 to drift over time. In block 408, the optical intensity measured by the OES 126 at the first time is compared with the optical intensity measured by the OES 126 at the second time. A correction factor can be determined by the comparing the intensities at the first and second times, which can be determined by comparing the ratio of peaks in each of the spectra. In optional block 410, the OES 126 is modified by the correction factor determined in block 408. In some embodiments, a computer-readable storage medium within the computer 128 is configured to receive information from the OES 126, and a processor within the computer 128 modifies the OES 126 by the correction factor determined in block 408.

Figure 5:
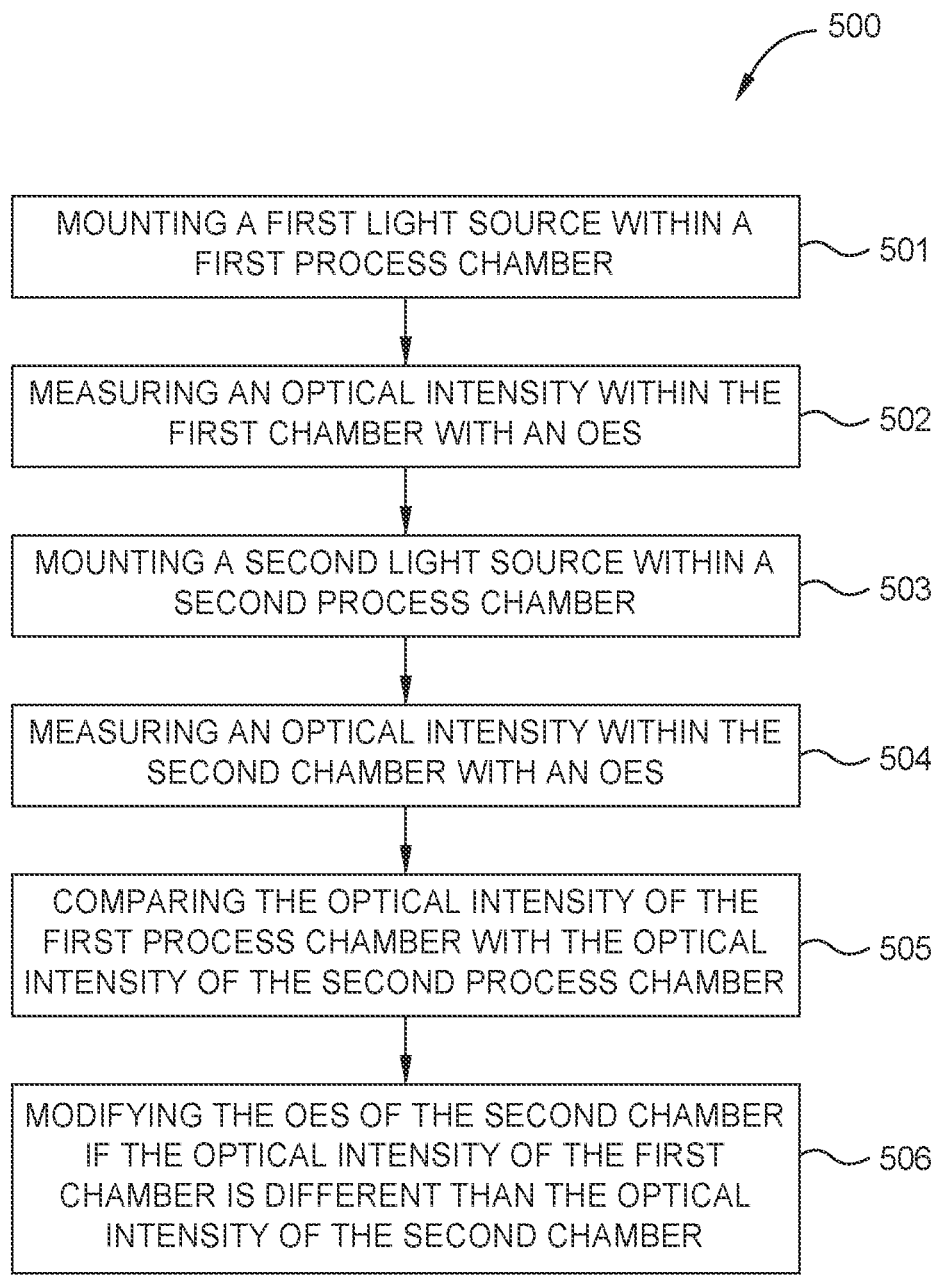
FIG. 5 is a method for calibrating the OES according to at least on embodiment described herein.

FIG. 5 is a method 500 for calibrating the OES 126 of one or more additional process chambers from the OES calibration readings of a first process chamber, according to at least one embodiment described herein. By calibrating the OES of one or more additional process chambers using the calibration readings from the first process chamber ensures consistent plasma process results from one chamber to another. In these embodiments, the method 500 is performed with the devices described in FIGS. 1-3, but is not limited to these devices and can be performed with other similar devices. In block 501, a first light source, e.g., the light source 119 within the fixture 118, is mounted to the plate 116 within a first process chamber such as the process chamber 101. The light source 119 within the light fixture 118 provides the optical path 122 between the light source 119 and the OES 126 located outside the process chamber 101. As discussed above, the optical path 122 travels from the light source 119 into a diffuser tube 120 located inside the process chamber 101. The optical path 122 continues from the diffuser tube 120 through an optical window 121 attached to a side wall 102 of the process chamber 101, then from the optical window 121 into a fiber optic line 124. In block 502, the optical intensity of radiation from the light source 119 is measured with the OES 126 within the first chamber. The optical intensity of radiation from the light source 119 at the first time can show peaks of well-defined wavelengths for certain atoms, such as oxygen, for example. The measurements within the first chamber can occur before any processing has occurred and thus before any drifting of the OES 126 occurs. The optical intensity of radiation measurements within the first chamber are captured by a computer-readable storage medium within the computer 128 configured to receive information from the OES 126. The optical intensity measurement captured within the first chamber is provided to the computer 128 of one or more additional chambers. After measuring the optical intensity of radiation in the first chamber, the light fixture 118 can be removed from the process chamber 101 where a deposition process on the substrate 110 may then be performed any number of times.

In block 503, a second light source, e.g., the light source 119 in the light fixture 118, is mounted to the plate 116, within a second process chamber such as the process chamber 101. In one embodiment, the first light source and the second light source are the same light source 119. In another embodiment, the first light source and the second light source are different light sources 119. The light source 119 within the light fixture 118 provides the optical path 122 between the light source 119 and the OES 126 located outside the process chamber 101. The optical path 122 travels from the light source 119 into a diffuser tube 120 located inside the process chamber 101. The optical path 122 continues from the diffuser tube 120 through an optical window 121 attached to a side wall 102 of the process chamber 101, then from the optical window 121 into a fiber optic line 124. In block 504, the optical intensity of radiation from the light source 119 is measured with an OES 126 within the second chamber. In block 505, the optical intensity measured by the OES 126 within the first chamber is compared with the optical intensity measured by the OES 126 within the second chamber. A correction factor can be determined by the comparing the intensities within the first chamber and the second chamber, which can be determined by comparing the ratio of peaks in each of the spectra. In optional block 506, the OES 126 of the second chamber is modified by the correction factor determined in block 408. In some embodiments, a computer-readable storage medium within the computer 128 is configured to receive information from the OES 126, and a processor within the computer 128 modifies the OES 126 by the correction factor determined in block 408.

Figure 6:
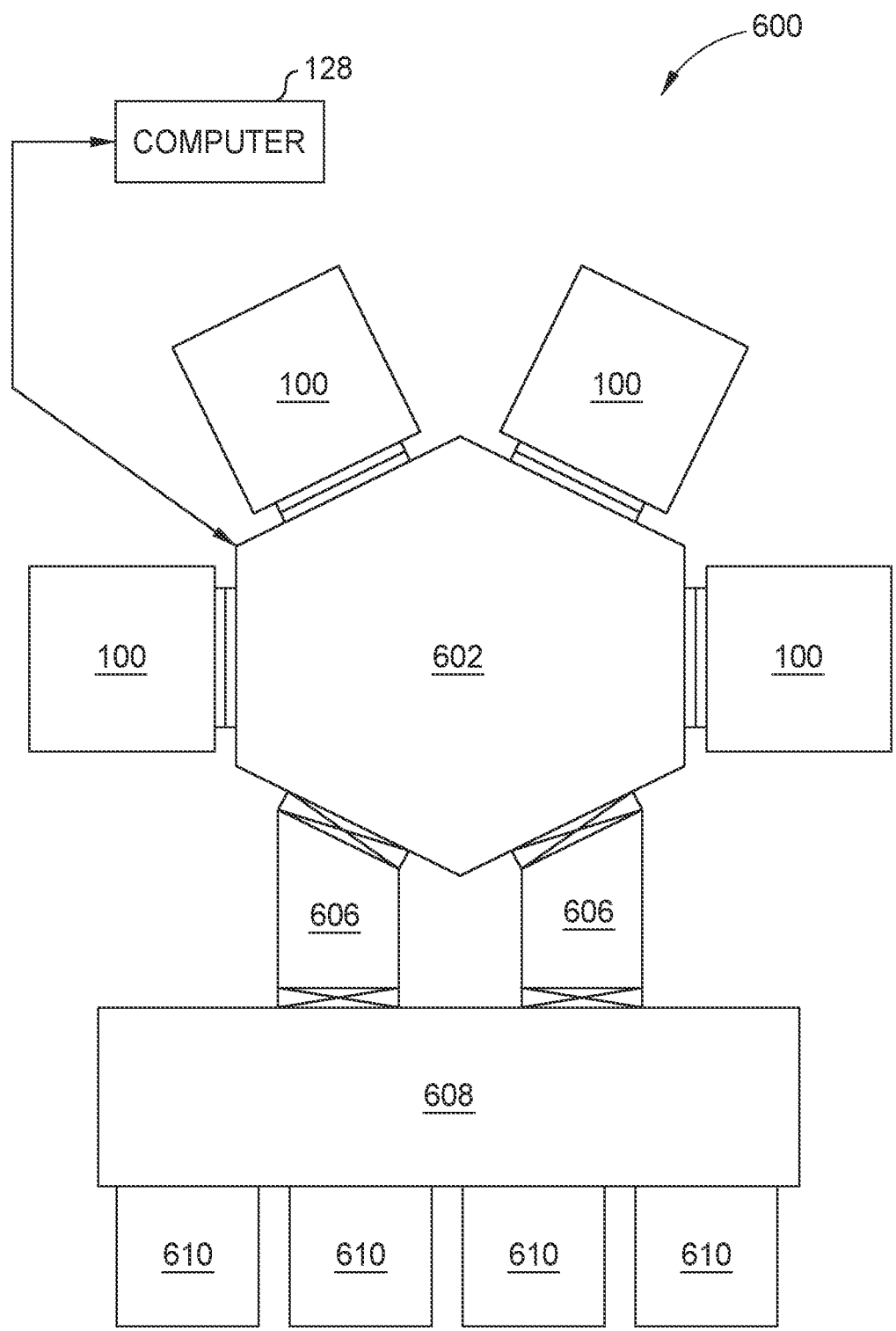
FIG. 6 is a schematic view of a semiconductor process system according to at least one embodiment described herein.

FIG. 6 illustrates an electronic device manufacturing system 600 in accordance with one or more embodiments described above. Electronic device manufacturing system 600 may be configured to process multiple substrates concurrently. Substrates include semiconductor wafers, glass plates or panels, and/or other workpieces used to make electronic devices or circuit components. Electronic device manufacturing system 600 include a transfer chamber 602, a plurality of process chambers 100 such as described above, and one or more load lock chambers 606, each of which may operate at a vacuum pressure. Transfer chamber 602 includes a robot (not shown) configured to transfer substrates to and from each process chamber 100 and each load lock chamber 606. Load lock chambers 606 may be coupled to a factory interface 608 and may provide a first vacuum interface between factory interface 608 and transfer chamber 602. Factory interface 608 may be coupled to one or more FOUPs (front opening unified pods) 610. Each FOUP 610 is a container having a stationary cassette for holding multiple substrates.

The computer 128 controls some or all of the processing and transferring of substrates in and through electronic device manufacturing system 600. The computer 128, as described above, may include a computer readable storage medium and processor, and the computer 128 may send and receive signals from other parts of the semiconductor process system 600. The computer 128 may be, e.g., a general purpose computer and/or may include a processor, such as a microprocessor, or other suitable CPU (central processing unit), a memory, such as the computer-readable storage medium for storing software routines that control electronic device manufacturing system 600, input/output peripherals, and support circuits (such as, e.g., power supplies, clock circuits, circuits for driving robots, a cache, and/or the like). The computer-readable storage medium may be configured to receive information from the OES 126 at each process chamber 100, and when executed by a processor performs an operation, comprising: comparing the optical intensity of radiation at a first time, or within a first chamber, with the optical intensity of radiation at a second time, or within a second chamber; and modifying the OES if the optical intensity of radiation at the first time or chamber is different than the optical intensity of radiation at the second time or chamber.

Embodiments herein provide the advantages of allowing the OES 126 to be calibrated while it remains attached to the outside of the process chamber 101, saving time and providing more convenience when compared to conventional OES 126 calibration methods. Additionally, the OES 126 calibration is more accurate because the OES 126 and its related parts, such the diffuser 120, the optical window 121, and the fiber optic line 124, remain in place throughout the calibration. Embodiments herein also provide the advantages of the plate 116 having a specific geometry such that it is mounted to fit within the process chamber 101. The plate 116 also prevents the light fixture 118 and the light source 119 from falling to the bottom portion of the process chamber 101. The light source 119 is positioned to advantageously provide an optical signal 122 directly to the OES 126 through the diffuser tube 120 and optical window 121. The light source 119 is also positioned within the light fixture 118 such that it avoids all the components within the process chamber 101.

While the foregoing is directed to implementations of the present invention, other and further implementations of the invention may be devised without departing from the basic scope thereof, and the scope thereof is determined by the claims that follow.

We claim:

1. A method for calibrating an optical emission spectrometer (OES), comprising:
measuring an optical intensity of radiation from a first light source mounted within a first process chamber with a first OES located outside the first process chamber;
measuring an optical intensity of radiation from a second light source mounted within a second process chamber with a second OES located outside the second process chamber;
determining a correction factor by comparing the optical intensity of radiation within the first chamber with the optical intensity of radiation within the second chamber; and
modifying the second OES by the correction factor when the optical intensity of radiation within the first chamber is different than the optical intensity of radiation of the second chamber.

2. The method of claim 1, wherein the first light source and the second light source are the same light source.

3. The method of claim 1, wherein the first light source and the second light source each have a wavelength spectrum in a range from about 200 nm to about 800 nm.

4. The method of claim 1, wherein a first optical path travels from the first light source into a first diffuser located inside the first process chamber, and a second optical path travels from the second light source into a second diffuser located inside the second process chamber.

5. The method of claim 4, wherein a first optical path travels from the first diffuser through a first optical window attached to a side wall of the first process chamber and a second optical path travels from the second diffuser through a second optical window attached to a side wall of the second process chamber.

6. The method of claim 5, wherein the first optical path travels through the first optical window into a first fiber optic line, and the second optical path travels from the second optical window into a second fiber optic line.

7. The method of claim 6, wherein the first fiber optic line and the second fiber optic line each have a 400 μm core.

8. A method for calibrating an optical emission spectrometer (OES), comprising:
mounting a first light fixture within a first process chamber, wherein the light fixture includes a first light source;
measuring an optical intensity of radiation from the first light source with a first OES located outside the first process chamber;

removing the first light fixture from the first process chamber after measuring the optical intensity of radiation;

mounting a second light fixture within a second process chamber, wherein the second light fixture includes a second light source;

measuring an optical intensity of radiation from the second light source with a second OES located outside the second process chamber;

comparing the optical intensity of radiation within the first process chamber with the optical intensity of radiation within the second process chamber; and modifying the second OES when the optical intensity of radiation within the first chamber is different than the optical intensity of radiation within the second process chamber.

9. The method of claim 8, wherein the first light source and the second light source are the same light source.

10. The method of claim 8, wherein the first light source and the second light source are xenon flash lamps.

11. The method of claim 8, wherein a first optical path travels from the first light source into a first diffuser located inside the first process chamber and a second optical path travels from the second light source into a second diffuser located inside the second process chamber.

12. The method of claim 11, wherein the first optical path travels from the first diffuser through a first optical window attached to a side wall of the first process chamber and the second optical path travels from the second diffuser through a second optical window attached to a side wall of the second process chamber.

13. The method of claim 12, wherein the first optical path travels through the first optical window into a first fiber optic line, and the second optical path travels from the second optical window into a second fiber optic line.

14. The method of claim 13, wherein the first light source and the second light source each have a wavelength spectrum in a range from about 200 nm to about 800 nm.

15. A process system, comprising:
a plurality of process chambers;
a plate mounted within at least two of the plurality of the process chambers;
an optical emission spectrometer (OES) located outside the each of at least two of the process chambers;
a light fixture mounted to each plate, wherein each light fixture includes a light source, wherein:
an optical path is provided between the light source and the OES, and wherein the OES measures an optical intensity of radiation from the light source; and
a computer-readable storage medium configured to receive information from the OES, and when executed by a processor performs an operation, comprising:
comparing the optical intensity of radiation from a first chamber of the plurality of chambers with the optical intensity of radiation from a second chamber of the plurality of chambers; and
modifying the OES from the second chamber of the plurality of chambers when the optical intensity of radiation of the first chamber is different than the optical intensity of radiation of the second chamber.

16. The system of claim 15, wherein the light source is a xenon flash lamp.

17. The system of claim 16, wherein the light source has a wavelength spectrum in a range from about 200 nm to about 800 nm.

18. The system of claim 15, wherein the optical path travels from the light source into a diffuser located inside each process chamber.

19. The system of claim 18, wherein the optical path travels from the diffuser through an optical window attached to a side wall of each process chamber.

20. The system of claim 19, wherein the optical path travels through the optical window into a fiber optic line.

* * * * *